(12) United States Patent
Cornillault et al.

(10) Patent No.: US 6,233,005 B1
(45) Date of Patent: May 15, 2001

(54) METHOD AND DEVICE FOR ADJUSTING THE TRANSVERSE POSITION OF A MOVING MACHINE

(75) Inventors: Jean Cornillault, Nozay; Jean-Louis Duvent, Longjumeau; Jean-Pierre Potier, Malmaison; Christian Tabaillon, Pelussin, all of (FR)

(73) Assignee: Compagnie Industrielle des Lasers Cilas, Marcoussis (FR)

( * ) Notice: Subject to any disclaimer, the term of this patent is extended or adjusted under 35 U.S.C. 154(b) by 0 days.

(21) Appl. No.: 08/747,278

(22) Filed: Nov. 12, 1996

(30) Foreign Application Priority Data

Nov. 14, 1995 (FR) .................................................. 95 13461

(51) Int. Cl.$^7$ ................................. H04N 7/18; H04N 9/47
(52) U.S. Cl. .............................................. 348/94; 348/116
(58) Field of Search .................................. 348/86, 94, 95, 348/135, 142, 50, 67, 139; H04N 7/18, 9/47

(56) References Cited

U.S. PATENT DOCUMENTS

| | | | |
|---|---|---|---|
| 4,238,828 | * 12/1980 | Hay et al. | 348/82 |
| 5,236,054 | * 8/1993 | Jack et al. | 175/57 |
| 5,426,584 | 6/1995 | Kamimura et al. | 364/424.02 |
| 5,528,518 | * 6/1996 | Bradshaw et al. | 702/150 |

FOREIGN PATENT DOCUMENTS 2 143 969   2/1985 (GB) .
58-072212   4/1983 (JP) .

OTHER PUBLICATIONS

IEEE Proceedings of the International Conference on Robotics and Automat, May 12–14, 1992, vol. 3, "Real Time Determination of the Location and Speed of Mobile Robots Running on Non–Planar Surfaces", pp. 2594–2599.

IEEE Proceedings of the Mediterranean Electrotehnical Conference, May 22–24, 1991, vol. 2, "Range Computation for a Mobile Robot Using Stereoscopic Vision", pp. 1242–1245.

* cited by examiner

Primary Examiner—Vu Le
Assistant Examiner—Nhon T Diep
(74) Attorney, Agent, or Firm—Marshall, O'Toole, Gerstein, Murray & Borun

(57) ABSTRACT

A device for adjusting the lateral position of at least one part of a moving machine for constructing a structure on a terrain includes a measuring device, at least one sensor, a positioning system and a computer adapted to determine theoretical and actual transverse positions of the part of the machine and to command the positioning system in such manner as to render the theoretical and actual transverse positions coincident.

15 Claims, 4 Drawing Sheets

METHOD AND DEVICE FOR ADJUSTING THE TRANSVERSE POSITION OF A MOVING MACHINE

BACKGROUND OF THE INVENTION

1. Field of the Invention

The present invention concerns a method and a device for adjusting the transverse position of at least part of a moving machine moving along a predetermined path across a terrain in order to construct a structure on said terrain.

In the context of the present invention the expression "transverse position of a moving machine or part of a moving machine" refers to the position of said machine or said part thereof in the plane transverse to the movement of the machine.

The present invention applies more particularly, although not exclusively, to adjusting the transverse position of moving machines used on civil engineering sites to construct structures. In the context of the present invention, the term "structure" means any form of construction that can be effected on a terrain; by transformation of the terrain or otherwise, for example surfacing a road or an airport runway or digging a trench.

2. Description of the Prior Art

The machines used to carry out this work must usually be directed along a predefined path in a geodesic frame of reference. To construct said structure according to a predefined design, said machine or at least a part of said machine, generally the part of said machine designed to construct the structure, must be in an appropriate transverse position as the machine moves.

The path to be followed is generally marked out by a line stretched between a large number of stakes fixed into the ground and the machine is provided with mechanical feelers that remain in contact with said line at all times and which signal any variation of the position of the machine relative to the prescribed position indicated by said line, enabling adjustment of the transverse position of the machine by controlling it in such manner as to eliminate any variation in position that may appear.

Said line at a particular height above the ground and running along a particular path enables the machine to follow said particular path and enables adjustment of the transverse position of the machine as it moves.

This method of adjusting the transverse position has many drawbacks, and in particular:
a high operating cost due to the installation of the line and the stakes carrying said line;
the impediment that said line stretched above the ground represents; and
the impossibility of having the machine take up a transverse position different from that defined by the stretched line.

French patent FR-A-2 637 625 describes a method for adjusting the transverse position of at least part of a mobile machine adapted to construct a structure in a terrain and to this end moving over said terrain along a particular path, in which method:
A/ a theoretical transverse position of said part of the machine is determined; and
B/ during said displacement along said particular path, the transverse position of said part of the machine is adjusted by carrying out the following operations repetitively:
the actual transverse position of said part of the machine is detected; and
said part of the machine is commanded so that its actual transverse position corresponds to the particular theoretical transverse position.

An object of the present invention is to improve on the above method and the present invention concerns a method and a device for adjusting the transverse position of at least one part of a mobile machine that does not require for its implementation any mechanical contact with a line or with any other control means fixed to the ground and liable to constitute an impediment.

Document GB-2 228 507 describes control equipment for an earthmoving machine and including a laser emitter at a fixed point on the ground and emitting a laser beam that can be detected by sensors installed on the machine, said laser beam defining an imaginary fixed line determining the path to be followed by the machine and serving as a reference for control of an earthmoving unit of said machine in a plane transverse to said imaginary line.

The method proposed by the above document has a number of major drawbacks, however. Firstly, a laser emitter at a fixed point is required, which can obviously cause problems in bad weather conditions, all the more so since an emitter of this kind is usually constructed from relatively fragile components.

Secondly, the adjustment of the transverse position is not effected relative to the ground, but relative to the imaginary line defined by said laser beam. This is not a problem in the case of the earthmoving application with which the aforementioned document is concerned, but this method of adjustment may be difficult to use to construct a structure having a particular shape dependent on the profile of the terrain, since the shape of the terrain is not known in this case. On civil engineering sites in particular, many structures are constructed and other works are carried out in accordance with the profile of the terrain concerned, and this rules out the use of the solution disclosed in document GB-2 228 507.

Another object of the invention is to solve these drawbacks. It concerns a method for adjusting the transverse position of at least one part of a mobile machine adapted to move over a terrain to construct a structure, the implementation of this adjustment not requiring any contact with elements on the ground but nevertheless allowing for the shape of the terrain.

SUMMARY OF THE INVENTION

To this end, in accordance with the invention, in a method of the type described above, in step A/:
a) the profile of said terrain is remotely sensed;
b) the required theoretical transverse position of said part of the machine during the construction of said structure as said machine moves along said particular path is determined on the basis of the structure to be constructed and the sensed profile.

Accordingly, the transverse position of said part of the machine is adjusted in accordance with the profile of the terrain and not relative to an imaginary line, as in the above-mentioned document GB-2 228 507, and this removes the drawbacks previously mentioned.

Moreover, in accordance with the invention, operations a) and b) of the method of the invention can be effected either during a preliminary step before the machine moves or during its movement.

Advantageously, to perform the remote sensing of the profile of the terrain, the coordinates of a plurality of measurement points of said terrain in a particular frame of reference are remotely determined, and preferably, for remote determination of the coordinates of a measurement point of the terrain in a particular frame of reference:
a) a point whose coordinates are known in said frame of reference is defined as a reference point;

b) the distance D between said measurement point and said reference point is determined;

c) the angle φ between the vertical and a straight line segment passing through said measurement point and said reference point is determined;

d) the angle α between a particular horizontal direction, the coordinates of which are known in said frame of reference, and the projection into the horizontal plane of said straight line segment passing through said measurement point and said reference point is determined; and e) the coordinates of the measurement point in said frame of reference are determined from the coordinates of said reference point, from said distance D and from said angles 100 and α.

Advantageously, to sense the profile of the terrain and/or to detect the actual transverse position of the machine a materialization member is disposed on said terrain, for example of a kind that can be sensed remotely.

Advantageously, to facilitate the implementation of the method of the invention, said materialization member may include a reflective longitudinal strip, reflective targets and markers equidistantly disposed along said longitudinal strip, laterally thereof, said longitudinal strip facilitating the determination of the actual transverse position of the machine, said targets facilitating the sensing of points of the terrain and said markers making it possible to determine the distance the machine has advanced, as described hereinafter.

The present invention also concerns a device for implementing the method described above and adapted to be mounted on said machine.

In accordance with the invention, said device includes:

a measuring device for carrying out measurements for determining the coordinates of the measurement points of the terrain;

at least one sensor adapted for carrying out measurements for determining the actual transverse position of said part of the machine;

positioning means for transversely positioning said part of said machine; and a computer connected to said measuring device, to said sensor and to said positioning means for:
  determining the theoretical transverse position of said part of the machine;
  determining the actual transverse position of said part of the machine; and
  controlling the positioning means so that the actual transverse position of said part of the machine is made to correspond to the theoretical transverse position as the machine moves.

Said measuring device advantageously includes a rangefinder which is preferably in the form of a laser optical rangefinder and at least one direction finder.

Said rangefinder and said direction finder are advantageously mounted on a mobile platform controlled by said computer.

In one possible embodiment, said platform is a variable elevation and of fixed bearing. It is then necessary to provide a wide-angle (in bearing) active rangefinder to alleviate this immobility in bearing.

Said mobile platform can preferably be oriented in elevation and in bearing, which makes it possible to analyze as wide a part of the terrain as may be necessary.

Said sensor advantageously cooperates with a materialization member disposed on said terrain and said sensor includes a video camera adapted to observe said materialization member and to determine on the basis of such observation the actual transverse position of said part of the machine.

In this embodiment, said materialization member may be particularly simple and comprise a single diffusing and/or reflecting strip, for example.

In one embodiment, said sensor includes:

a laser source adapted to emit a laser beam; and a video camera for detecting the laser beam emitted by said laser source and reflected by said materialization member and for determining accordingly the actual transverse position of said part of the machine.

Said laser beam advantageously has a plane perpendicular to a reflective longitudinal strip on said materialization member.

In one preferred embodiment, the positioning means advantageously include rams on the machine adapted to adjust the transverse position of said part of the machine, i.e. the position in the heightwise direction and laterally to the direction of advance of said machine.

The figures in the accompanying drawings explain how the invention may be put into effect. In the figures, the same reference numbers identify similar items.

DETAILED DESCRIPTION OF THE PREFERRED EMBODIMENT

Figure 1:
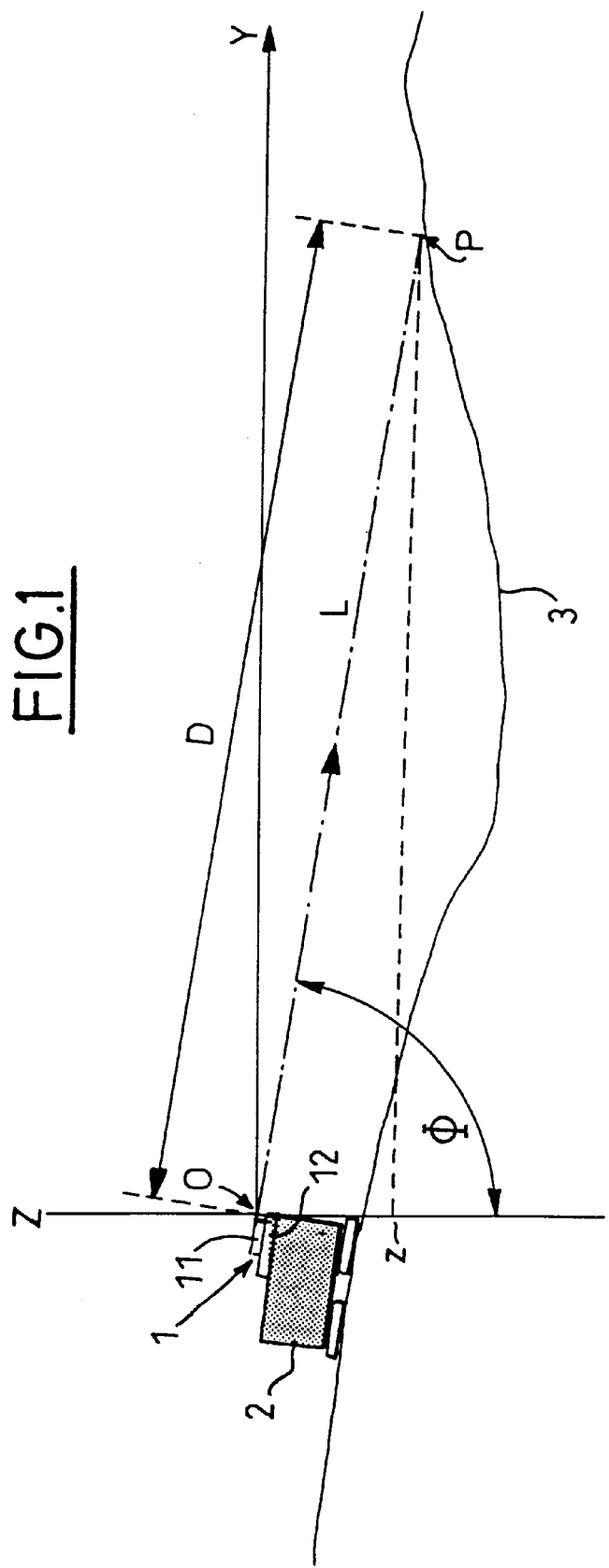
FIG. 1 shows a diagrammatic side view of a mobile machine on a terrain and provided with a device of the invention.
Figure 2:
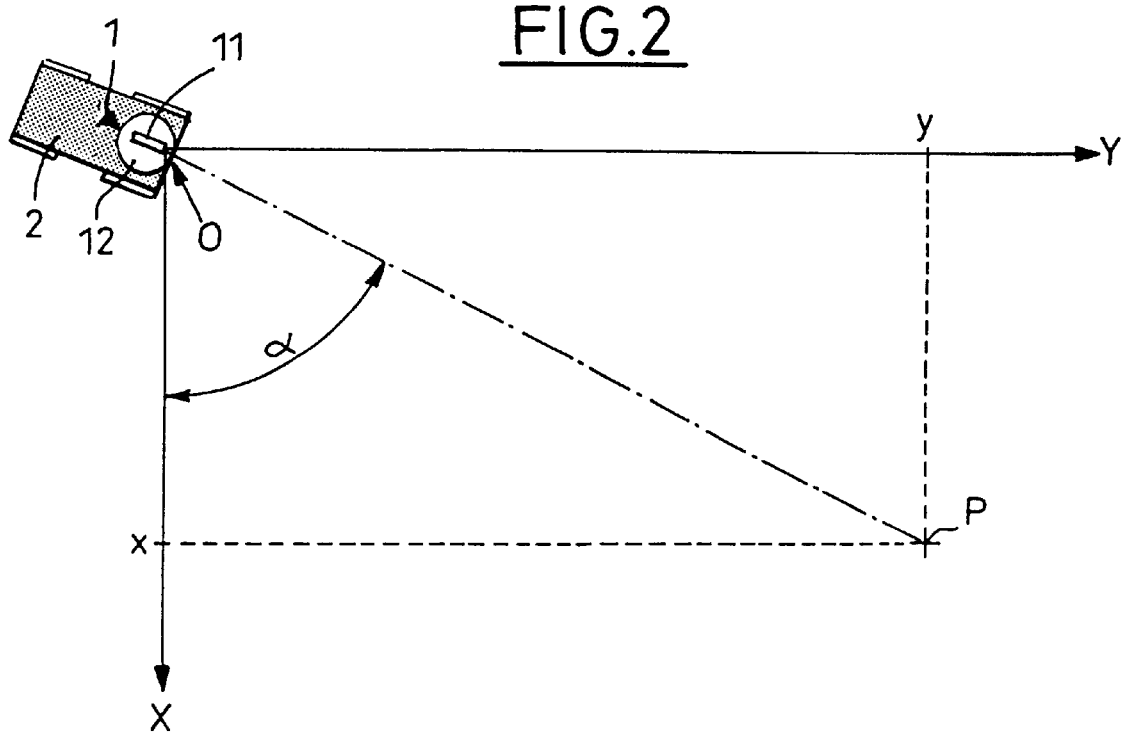
FIG. 2 is a diagrammatic plan view of the machine from FIG. 1.

The device 1 of the invention is mounted on a mobile machine 2, for example an earthmoving machine, shown diagrammatically in FIGS. 1 and 2.

Said device 1 is adapted to adjust the transverse position of the machine 2 as the latter moves along a particular path (not shown) over a terrain 3 to enable said machine 2 to construct a structure (not shown) on said terrain in accordance with a predefined design, by transformation of the terrain or otherwise. Although this is not the case in the example shown, the device of the invention may equally well be used to adjust only one part of the machine, for example a bulldozer blade or a digging shovel. The structure to be constructed may constitute a simple earthwork, the side of a road or a runway, for example. Although it is particularly well suited to controlling civil engineering plant, the present invention is obviously not limited to controlling civil engineering plant. It can be used in varied fields of activity.

Figure 3:
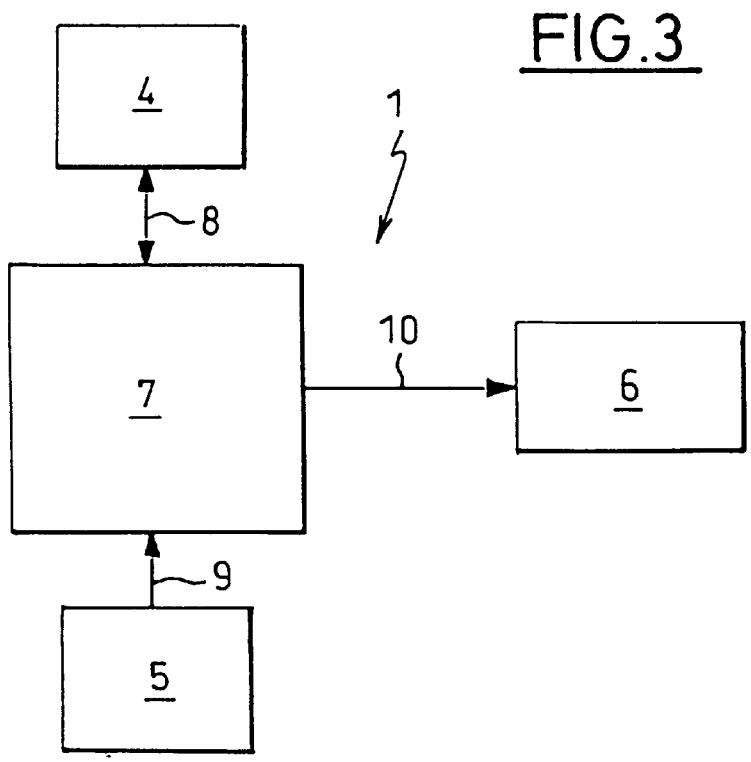
FIG. 3 is the block diagram of a device of the invention.

The transverse position is adjusted by carrying out measurements in a fixed frame of reference OXYZ. This may be a geodesic frame of reference or a frame of reference fixed relative to the machine 2. The latter solution is particularly beneficial from a practical point of view if the measurements are carried out before said machine moves, as in the present example. To this end, in accordance with the invention, the device 1 shown diagrammatically in FIG. 3 includes:

a measuring device 4 for effecting measurements enabling calculation in said frame of reference OXYZ of the coordinates (x, y, z) of points P on the terrain 3;

at least one sensor 5 for effecting measurements for determining the actual transverse position of the machine 2 in said frame of reference OXYZ;

positioning means 6 for modifying the transverse position of the machine 2; and a computer 7 connected to said measuring device 4, to said sensor 5 and to said positioning means 6 by respective links 8, 9 and 10, the functions of which are explained below.

Said measuring device 4 includes a rangefinder 11, preferably of a laser type known in itself, mounted on a mobile platform 12 on the machine 2. The point O of the frame of reference OXYZ is at the point used as the reference point by said rangefinder 11 to measure distances, OZ corresponds to the vertical direction, and OX and OZ correspond to two mutually orthogonal horizontal directions.

Said mobile platform 12 is controlled by said computer 7 and can be oriented in bearing and in elevation by dedicated drive means (not shown). In a different embodiment, said platform could be moved by pre-existing drive means on the machine.

Said rangefinder 11 is adapted to measure the distance D between said point O and any point P on the terrain by emitting a laser beam L towards said point P for this purpose, as shown diagrammatically in FIGS. 1 and 2. To this end, said laser beam is reflected at said point P, as described below.

The measuring device 4 further includes:

a first direction finder (not shown) for measuring the angle φ between said laser beam L and the vertical, i.e. the axis OZ of the frame of reference OXYZ, as shown in FIG. 1; and a second direction finder (not shown) for measuring the angle α between the projection in the horizontal plane OXY of the laser beam L and the direction OX, as shown in FIG. 2.

Using the duplicated link 8, the measuring device 4 transmits the measured values of said distance D and said angles α and φ to the computer 7 which from this information calculates the coordinates (x, y, z) of the point P in question in the OXYZ frame of reference, using the following equations:

$$x = Dx \sin \phi x \cos \alpha$$

$$y = Dx \sin \phi x \sin \alpha$$

$$z = Dx \cos \phi$$

The measurement device 4 and the computer 7 perform the above operations for a plurality of points P on the terrain 3. The computer 7 can define the profile of said terrain 3 on the basis of the points determined in this way.

Note that, in accordance with the invention, this remote sensing of the profile of the terrain 3 may be effected either in a preliminary step before the machine 2 moves and during which the machine 2 remains immobile in its natural position shown in FIG. 1 or during movement of said machine 2 and simultaneously with adjustment of the transverse position.

In accordance with the invention, said computer 7 also knows the configuration of the structure to be constructed in accordance with a predefined design. The computer 7 determines the theoretical transverse position that the machine 2 must assume as it moves in constructing the structure from this known configuration stored in the computer 7 and from the remotely sensed profile of the terrain.

It is then sufficient to control said machine 2 so that as it moves it is at all times in the theoretical transverse position determined in this way.

To this end, said sensor 5 carries out measurements at successive times enabling said computer 7 to determine the actual transverse position of the machine 2, said computer 7 thereafter commanding said positioning means 6 so that they bring said machine 2 into said theoretical transverse position if it is not there already.

To increase the precision of the measured values, it is possible to provide a plurality of sensors on the machine, for example two sensors, in which case one can be mounted at the front of the machine and the other at the rear.

To carry out the measurements, said sensor 5 is associated with a materialization member 13 having an unwindable rectangular support 13A placed on said terrain, in the direction in which the machine advances. Said unwindable support 13A must be flexible so that it faithfully follows the profile of the terrain 3 and strong and heavy in order to withstand all atmospheric conditions that may be encountered.

Said materialization element 13 includes a longitudinal strip 14 of a light-reflecting material having a rectangular cross-section at the center of said unwindable support 13A and adapted to cooperate with the sensor 5.

In accordance with the invention, said sensor 5 includes:

a laser source (not shown), for example a low-power laser diode with cylindrical focusing optics emitting a laser beam 15; and a video camera (not shown), preferably including a sensor with an array of photoreceptors of the charge coupled device type, adapted to detect the part of the laser beam 15 emitted by said laser source that is reflected by said reflective strip 14 of the materialization member 13 and to determine therefrom the actual transverse position of the machine 2, said laser source and said video camera being in particular fixed positions relative to each other.

Said sensor 5 carries out the measurements in accordance with a principle that is known in itself called profilometry.

Said laser source is arranged so that the plane 16 of the emitted laser beam 15 is perpendicular to said reflective strip 14.

Figure 4:
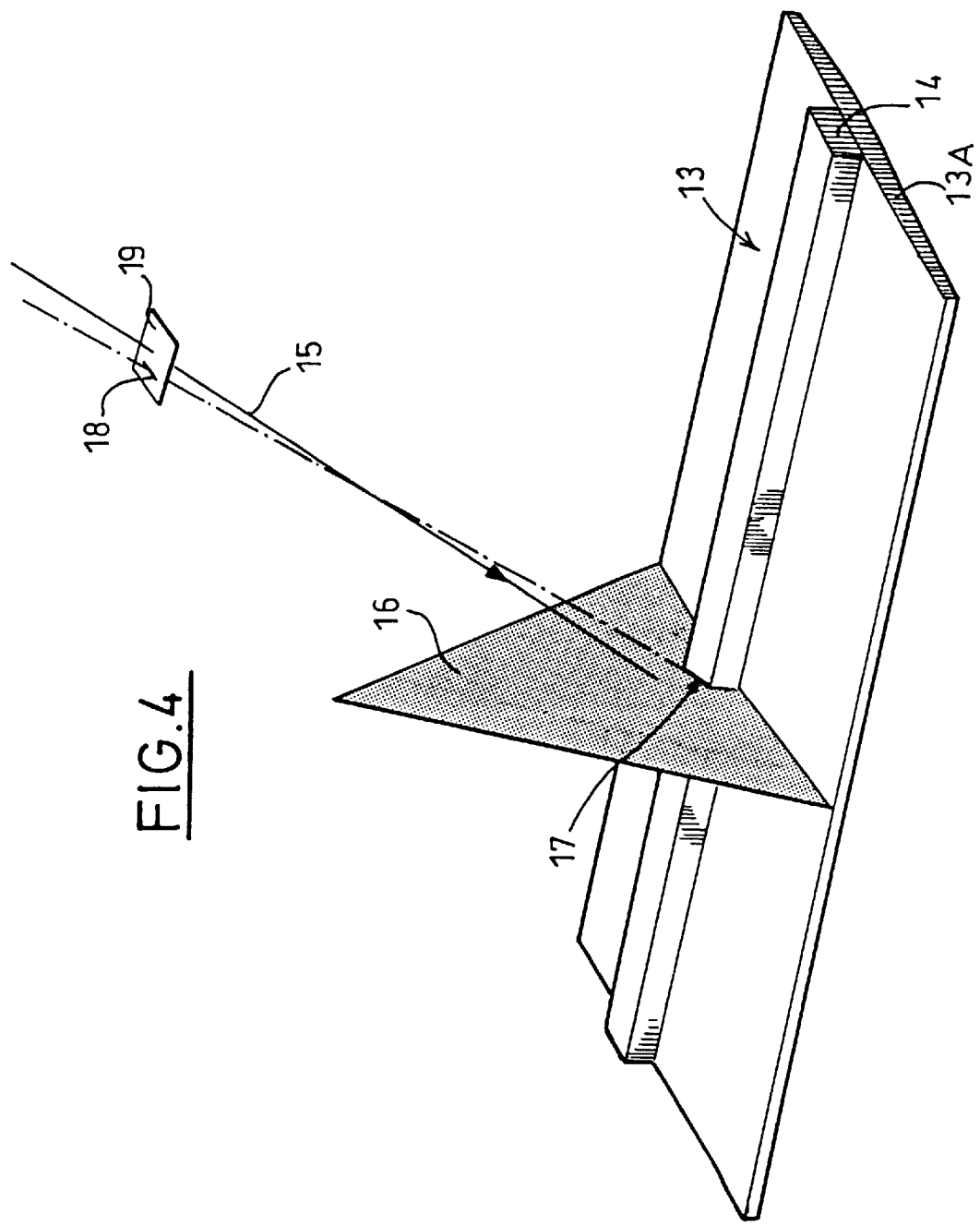
FIG. 4 is a diagram showing the measurement principle used to determine the actual transverse position of the machine.

After reflection, the video camera detects the straight line segment 17 of intersection between said laser plane 16 and said reflective strip 14. The position (row and column) of the image 18 of said straight line segment 17 in the plane of the photoreceptor matrix 19, shown diagrammatically in FIG. 4 and as determined by image processing techniques, enables the transverse position of the machine 2 to be determined, since said laser source and the video camera are in particular fixed positions relative to each other.

Accordingly, thanks to said sensor 5, the transverse (i.e. lateral and heightwise) position of the machine 2 is known at its location at the time the measurement is made. It is then further necessary to determine how far the machine has advanced, i.e. the distance travelled by said machine from a reference position, for example the initial position shown in FIG. 1, in order to know precisely where it is located on said path to be followed. The distance it has advanced is measured by said sensor 5 in cooperation with markers 20 which are in the form of regularly spaced parallelepiped-shape plates arranged on said materialization member 13 on either side of said reflective strip 14, in the form of two rows in a staggered arrangement, for example, as shown in FIG. 5.

Said sensor 5 therefore signals the movement of the machine past the markers 20, which enables said computer 7 to determine how far said machine 2 has advanced and therefore its position on said path.

Figure 5:
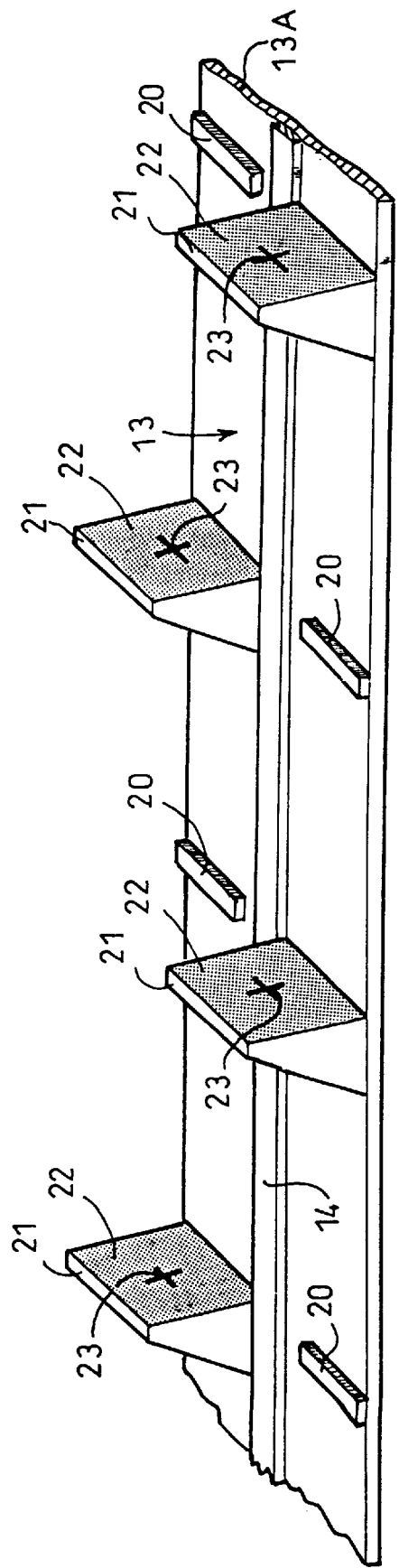
FIG. 5 is a partial perspective view of a materialization member used in implementing the invention.

Said materialization member 13 further includes targets 21 having a reflective face 22 carrying a centering marker 23 and disposed facing the machine 2, said target 21 being arranged laterally of said markers 20 in a manner that is symmetrical about said reflector strip 14, as shown in FIG. 5. Said reflecting targets 21 are used by said rangefinder 11 to determine the distance to the point P of the terrain 3 during remote sensing of the profile of the terrain, sending back the light beam L emitted by said rangefinder 11.

Accordingly, knowing the theoretical transverse position and the actual transverse position of the machine 2, said computer 7 then commands the positioning means 6 to move said machine laterally and in the heightwise direction in order to bring said machine 2 into the prescribed theoretical transverse position.

In the context of the present invention said positioning means 6 may be any device for adjusting the transverse position of the machine 2. For a machine driven by two pairs of caterpillar tracks, respectively at the front and at the rear of said machine, for example, like much civil engineering plant, said positioning means 6 may be a ram device, for example.

The adjustment of the transverse position proper of the machine 2, that is the detection of the actual transverse position and the appropriate positioning of the machine, is effected repetitively during the displacement of said machine 2 to construct the intended structure.

Although a sensor having a laser source is described above with reference to the figures, it goes without saying that in a different embodiment the sensor 5 could essentially comprise a video camera directed towards the materialization strip 13A with its retro-reflective line 14. Horizontal positioning would be performed as previously, by measuring the position of the line 14 relative to the frame of reference of the photosensitive matrix. Similarly, counting the luminous strips 20 that the machine moves past would enable the distance travelled to be measured.

The altitude of the sensor relative to the working surface would be measured by assessing the size of the image of the retro-reflective line. This is geometrically related to the width of the object line, to the focal length of the objective of the video camera and to the video camera-ground distance. It is therefore a simple matter to calculate the required altitude.

Compared to the first arrangement, this second embodiment has the advantage of providing additional information, i.e. the orientation of the object line relative to the frame of reference of the sensor, which is in turn related to that of the machine and to the direction in which it is moving. This is obtained by analyzing all of the image line, in the longitudinal direction, and not just its central part.

If local sensors are used separately, to obtain only lateral guidance of the machine, the strip laid on the ground would be simplified and would not include the retro-reflecting trihedrons.

To enhance the visibility of the line, it may be painted using a retro-reflective paint. In this case the sensor incorporates an auxiliary light source.

What is claimed is:

1. Method of adjusting the transverse position of at least one part of a moving machine for constructing a structure in a terrain and to this end moving over said terrain along a particular path, said method comprising the steps of:
   A/ determining a theoretical transverse position of said part of said machine, said step A/ comprising the steps of:
   a) remotely sensing the profile of said terrain; and
   b) determining the required theoretical transverse position of said part of the machine during construction of said structure as said machine moves along said particular path based on the structure to be constructed and the sensed profile; and
   B/ adjusting said transverse position of said part of said machine during displacement along said particular path by carrying out the following operations repetitively:
      detecting the actual transverse position of said part of said machine; and
      commanding said part of said machine so that its actual transverse position corresponds to the particular theoretical transverse position,
   wherein, to sense said profile of said terrain, a materialization member is disposed on said terrain, and
   wherein said materialization member includes a reflective longitudinal strip.

2. Method according to claim 1 wherein operations a) and b) are carried out as a preliminary step before said machine is moved.

3. Method according to claim 1 wherein operations a) and b) are carried out while said machine is moving.

4. Method according to claim 1 additionally comprising the step of remotely determining the coordinates of a plurality of measurement points of said terrain in a particular frame of reference to perform the remote sensing of said profile of said terrain.

5. Method according to claim 4 wherein said remotely determining step comprises the steps of:
   a) defining as a reference point a point whose coordinates are known in said frame of reference;
   b) determining a distance D between one of said measurement points and said reference point;
   c) determining an angle $\phi$ between the vertical and a straight line segment passing through said one measurement point and said reference point;
   d) determining an angle $\alpha$ between a particular horizontal direction, the coordinates of which are known in said frame of reference, and the projection into the horizontal plane of said straight line segment passing through said one measurement point and said reference point; and
   e) determining the coordinates of said one measurement point in said frame of reference from the coordinates of said reference point, said distance D and said angles $\phi$ and $\alpha$.

6. Method according to claim 1 additionally comprising the step disposing a materialization member on said terrain to detect said actual transverse position of said machine.

7. Method according to claim 1 wherein said materialization member includes reflective targets and markers equidistantly disposed along said longitudinal strip laterally thereof.

8. A device for adjusting the transverse position of at least one part of a moving machine for constructing a structure in a terrain and to this end moving over said terrain along a particular path by determining a theoretical transverse position of said part of said machine, said step A/ comprising the steps of: a) remotely sensing the profile of said terrain; and b) determining the required theoretical transverse position of said part of the machine during construction of said structure as said machine moves along said particular path based on the structure to be constructed and the sensed profile; and B/ adjusting said transverse position of said part of said machine during displacement along said particular path by carrying out the following operations repetitively: detecting the actual transverse position of said part of said machine; and commanding said part of said machine so that its actual transverse position corresponds to the particular theoretical transverse position, said device comprising:
   a measuring device for carrying out measurements for determining coordinates of measurement points of said terrain;

at least one sensor for carrying out measurements for determining said actual transverse position of said part of said machine, wherein said sensor cooperates with a materialization member disposed on said terrain and comprises:
  a laser source adapted to emit a laser beam, said laser beam having a plane perpendicular to a reflective longitudinal strip on said materialization member; and
  a video camera for detecting the laser beam emitted by said laser source and reflected by said materialization member and for determining accordingly said actual transverse position of said part of said machine;
positioning means for transversely positioning said part of said machine; and
a computer connected to said measuring device, to said sensor and to said positioning means, said computer determining said theoretical transverse position of said part of said machine, determining said actual transverse position of said part of said machine, and controlling said positioning means so that said actual transverse position of said part of said machine is made to correspond to said theoretical transverse position as said machine moves.

9. Device according to claim 8 wherein said measuring device includes a rangefinder and at least one direction finder.

10. Device according to claim 9 wherein said rangefinder is in the form of a laser optical rangefinder.

11. Device according to claim 9 wherein said rangefinder and said direction finder are mounted on a mobile platform controlled by said computer.

12. Device according to claim 11 wherein said mobile platform can be oriented in elevation and in bearing.

13. Device according to claim 8 wherein said sensor cooperates with a materialization member disposed on said terrain and said sensor includes a video camera adapted to observe said materialization member and to determine on the basis of such observation said actual transverse position of said part of said machine.

14. Device according to claim 13 wherein said video camera includes a sensor having a photoreceptive matrix.

15. Device according to claim 8 wherein said positioning means include rams on said machine adapted to adjust said transverse position of said part of said machine.

* * * * *